June 24, 1947.  A. J. HORTON ET AL  2,423,028
ELECTRIC CONTROLLER FOR MULTIUNIT MACHINES
Filed Aug. 7, 1944  5 Sheets-Sheet 2

INVENTORS

Fig. 7

Patented June 24, 1947

2,423,028

UNITED STATES PATENT OFFICE 2,423,028

ELECTRIC CONTROLLER FOR MULTIUNIT MACHINES

Albert J. Horton, White Plains, and William C. Wieking, Woodhaven, N. Y., assignors to R. Hoe & Co., Inc., New York, N. Y., a corporation of New York Application August 7, 1944, Serial No. 548,438

10 Claims. (Cl. 270—5)

1

This invention relates to multi-unit machines, and more particularly to improved means for driving multi-unit printing machines which have a plurality of printing units and folders that may be grouped in various combinations, depending on the number of pages in the product that is to be printed.

Modern multi-unit machines used for printing newspapers and similar products usually have their printing units and folders all arranged in alignment with three or four printing units between folders, and a plurality of motors are provided so that a machine may be operated as several separate printing machines, each of which can be separately started and stopped as required, each such separate machine including a folder and the number of printing units required for the work in hand. It is common practice to provide a motor adjacent each folder, and in some cases additional motors are provided which operate in conjunction with the motor at the folder to drive each group of printing units in use. However, in order to obtain the highest efficiency in the operation of these large multi-unit machines, it is considered advantageous to provide an individual motor having some excess power, for each printing unit, and supply no motors for the folders. By this practice, groups having any number of printing units and a folder may be formed, and the motor power included in the group will be properly proportioned to the power required for driving it.

The invention contemplates as one of its objects, the provision in a multi-unit machine of an improved control system including a plurality of motor controllers, one for each driving motor in the machine, with control stations for each machine unit and means whereby the arrangement of the electrical connections to operate various groupings of units may be made with facility.

Another object of this invention is to provide an improved control system for a multi-unit machine in which each machine unit is provided with a motor suitable to drive the unit at running speed and certain of the motors are arranged with gearing whereby those motors alone will each drive several of the units at a slow speed.

It is also an object of the invention to provide an improved control system for a multi-unit printing machine having a plurality of motor controllers and control stations, that will be relatively simple in construction, as well as convenient, practical, serviceable and efficient in use.

2

With the foregoing and other objects in view, that will appear as the description proceeds, the invention resides in the combination and arrangement of parts and in the mechanical and electrical details of construction hereinafter described and claimed.

A practical embodiment of the invention, as applied to a multi-unit printing machine drive of the type disclosed in Patent Number 2,356,160, is illustrated in the accompanying drawings, wherein.

Figure 1:
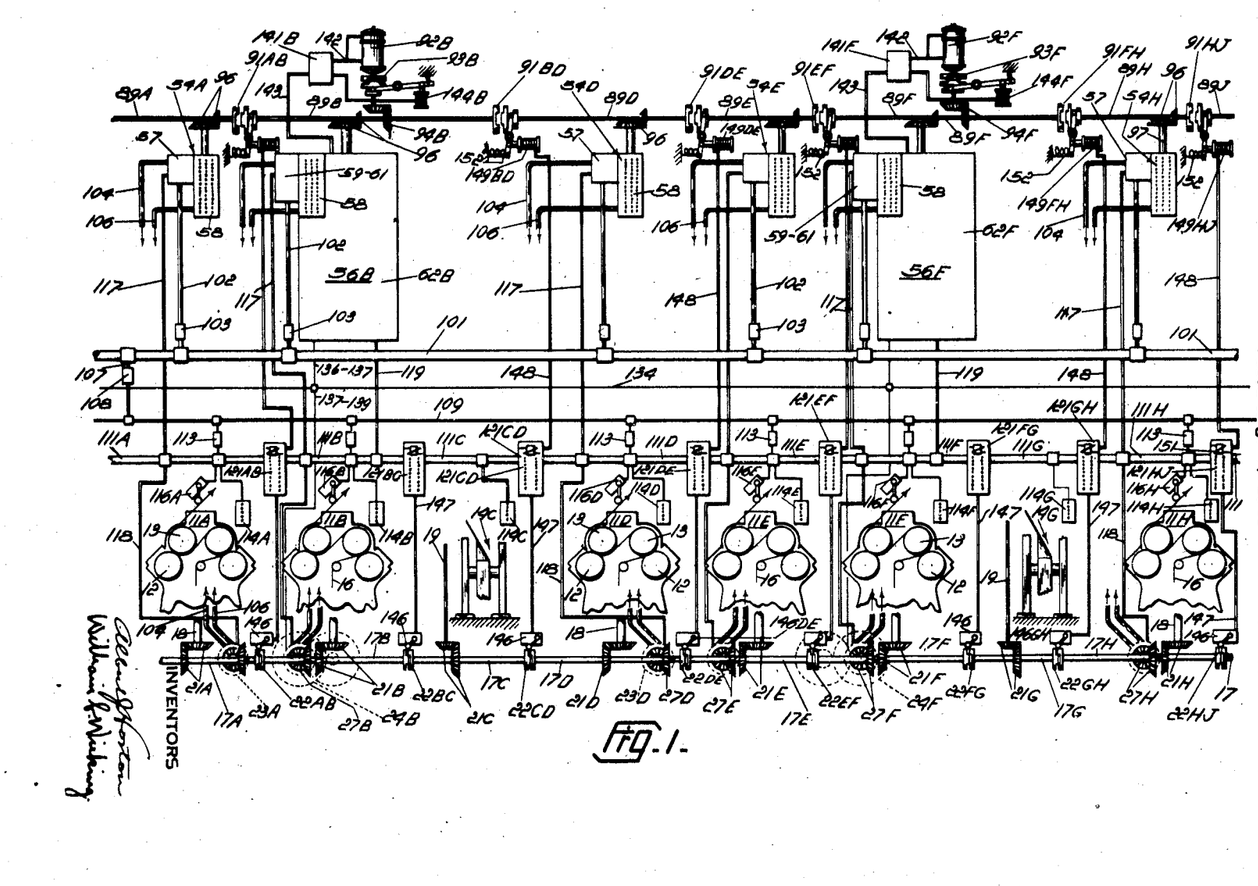
Figure 1 is a diagrammatic view showing a portion of the side elevation of a multi-unit printing machine, to which the control system of the invention is applied.
Figures 2, 3, 4:
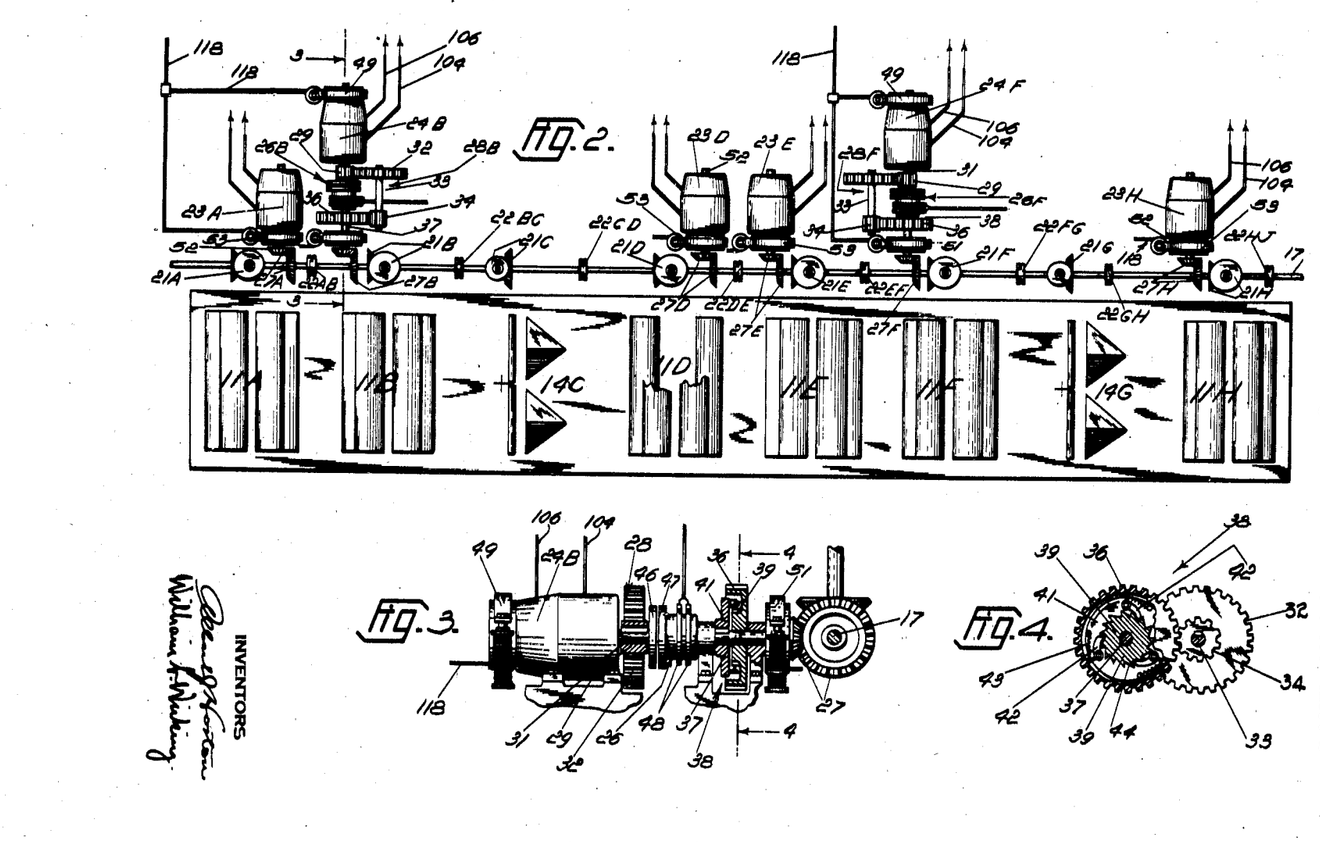
Figure 2 is a diagrammatic plan view of the portion of the machine shown in Figure 1 and showing the motors for driving the machine.
Figure 3 is an enlarged view of one of the driving motors shown in Figure 2, partly in section as seen on the line 3—3 of Figure 2.
Figure 4 is a fragmentary sectional view of a portion of the gearing as seen on the line 4—4 of Figure 3.

In the drawings, Figures 1 and 2 show a typical newspaper printing machine having six printing units and two folders, there being three printing units between the folders. It will be understood that the line of printing units may be extended indefinitely at either end, with the units all in line, or additional units may be placed in another line positioned either angularly to, or aligned in parallel relation with the units shown in the drawings, and folders may be placed so they are separated either by a greater or lesser number of units as desired, any such variation being within the capacity of control equipment made in accordance with the invention.

The printing units, the folders and many other members of the equipment as herein shown, are preferably identical, and all such similar members are identified by the same numeral, but for convenience, a capital letter is added to the numeral to identify each particular member whenever it is individually mentioned, thus the several printing units 11 are indicated 11A, 11B, 11D, 11E, 11F and 11H. Each of the printing units includes two form cylinders 12 that cooperate with impression cylinders 13. A folder 14C is disposed between the printing units 11B and 11D and another folder 14G is disposed between the printing units 11F and 11H. The printing units and folders are thus positioned in alignment and a plurality of groups, each including a folder and the number of units required for the work in hand, may be arranged, and thereby utilize the equipment to the best advantage.

Webs 16 (Figure 1) are led upwardly from a suitable source of supply (not shown) to each of the units and after being printed thereby, are slit, associated and in the usual manner fed toward and into the folders 14C and 14G.

Each of the printing units and the folders are connected to a main line driving shaft 17 (Figure 1) through vertical shafts 18 and 19 respectively, that are geared to the main line shaft 17 by means of pairs of cooperating bevel gears 21A, 21B, 21C, 21D, 21E, 21F, 21G, and 21H. The shafts 18 and 19 are connected to the cylinders of each unit and to the folders respectively by suitable gearing (not shown) in accordance with the usual practice. The main line shaft 17 is made up of unit shaft sections 17A, 17B, 17D, 17E, 17F, and 17H, one for each printing unit, and sections 17C and 17G one for each folder. The shaft sections are connected by couplings designated as 22AB, 22BC, 22CD, 22DE, 22EF, 22FG, 22GH and 22HJ, located between the ends of the unit shaft sections. Any of the couplings may be disengaged to separate the line shaft into two or more groups of sections.

Electric motor equipment, as herein shown comprising electric motors 23A, 23D, 23E, 23H, and 24B and 24F, and preferably equal in number to the printing units, is provided. Motors 24B and 24F are master motors and are arranged to drive the main line shaft at printing speeds, directly through magnetic clutches 26B and 26F, and bevel gears 27B and 27F respectively, or, for slow speed operation, as when threading a web through the machine, they may drive the main line shaft through speed reduction gearing 28B and 28F. Motors 23A, 23D, 23E, and 23H are dependent motors which drive the main line shaft only at printing speeds, and through cooperating bevel gears 27A, 27D, 27E, and 27H.

Each speed reduction gearing 28 (Figures 2-4) includes a gear pinion 29 secured on a motor shaft 31 and in mesh with a gear 32, secured on a jack shaft 33. A gear pinion 34, secured on the shaft 33, meshes with a cup-shaped overrunning clutch gear 36, freely rotatable on a shaft 37, which is in alignment with the motor shaft 31. The gear 36 has an overrunning clutch device 38 operably associated therewith, that comprises a ratchet wheel 39 formed integral with and on the inner face of the cup-shaped overrunning clutch gear 36. A disc 41 keyed to the shaft 37 carries a plurality of pawls 42 each of which is urged by a spring 43 into cooperating engagement with ratchet teeth 44 provided on the periphery of the wheel 39, to drive the shaft 37 in the same direction of rotation as that of the motor shaft 31. The shaft 37 is connected to the main line shaft 17 through the bevel gears 27.

The magnetic clutch 26 includes one clutch part 46 secured to the motor shaft 31 and another clutch part 47 having slip rings 48 secured to the shaft 37 that carries one of the cooperating bevel gears 27. When the coil of the clutch part 47 is energized through slip rings 48 in a manner to be hereinafter explained, the motor (24B or 24F) will drive the main line shaft 17 at high speed; but when the clutch is deenergized the main line shaft 17 is driven at a reduced speed by the motor (24B or 24F). The motor shafts 31 are each equipped with a magnetically operated brake 49 and the shafts 37 are each equipped with a magnetically operated brake 51. Each of the shafts 52 of dependent motors 23 are equipped with a magnetically operated brake 53.

It will be understood, that instead of either form of gearing having a jack shaft as herein shown, any suitable form of planetary gearing may be used between the shafts 31 of the motors (24B and 24F) and the shafts 37 that carry the bevel gears 27, if suitable remotely controlled mechanism is provided to actuate the clutch or clutches required to selectively bring the high and slow speed gears into operation.

Figure 5:
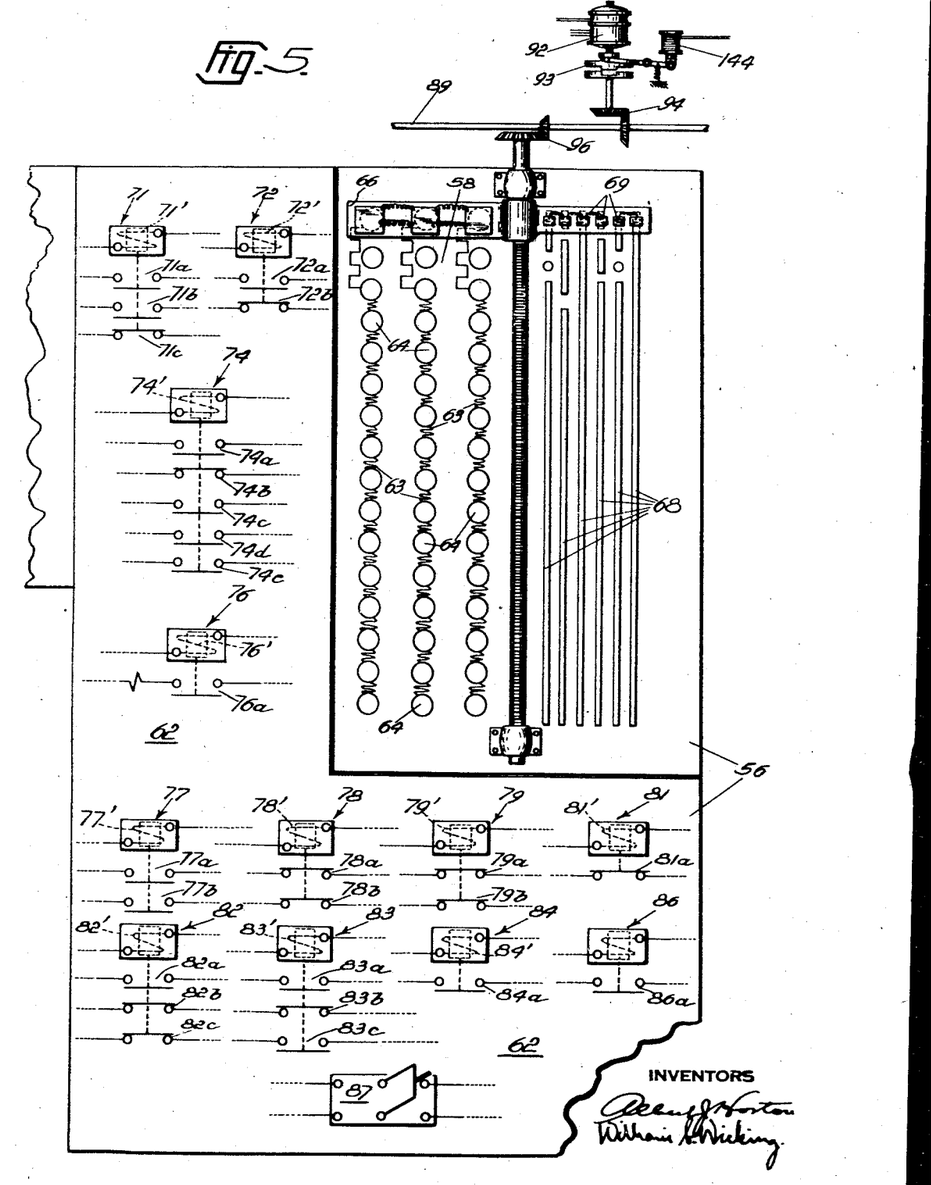
Figure 5 is a diagrammatic view of one of the master control panels that are used with some of the motors.

Figure 1 shows four dependent motor panels or controllers 54A, 54D, 54E, and 54H each arranged to control one of the dependent motors 23A, 23D, 23E, and 23H respectively, and also shows two master motor panels or controllers 56B and 56F, arranged to operate the master motors 24B and 24F respectively. These controllers with their pilot motors and operating mechanism as hereinafter described are usually mounted on a balcony or other suitable location away from the machine. Each dependent controller 54 (Figure 6) comprises a solenoid operated motor contactor 57 and a speed control rheostat 58, for controlling the various dependent motors 23. Each of the master controllers 56 includes a pair of solenoid operated motor contactors 59 and 61, a speed control rheostat 58, and a master control assembly 62. Each of the speed control rheostats 58 (Figures 5 and 6) includes resistances 63 connected to a plurality of face-plate contacts 64, that may be contacted by a crosshead 66 of the master controller 56 or by a crosshead 67 of the dependent controller 54 respectively to progressively short circuit the steps of resistance 63 and thus control the speed of the motors in a well known manner. Each master controller 56 (Figure 5) includes a plurality of suitable contact strips 68 and brushes 69 operatively cooperating with the master control assembly 62 which has a plurality of solenoid operated relays designated as: "slow-speed" relay 71, "off" relay 72, "fast speed" relay 74, a "drive motor" relay 76, an "on" relay 77, a "first auxiliary" relay 78, a "safe" relay 79, a "stop" relay 81, a "second auxiliary" relay 82, a "signal" relay 83, a "paper break" relay 84 and a "magnetic clutch" relay 86. Each of the relays are provided with a suitable number of normally-open and normally-closed switches which are operated by their solenoids. For convenience the solenoid of each relay is designated by the relay numeral primed, as 71', while the switches are designated by the relay numeral followed by a lower-case letter as 71a or 71b. A double-pole, double-throw transfer switch 87 which is normally closed toward the right (Figure 6) is also associated with each master control panel 56B and 56F.

A pilot or control line shaft 89 (Figure 1) is made in sections 89A, 89B, 89D, 89E, 89F and 89H, equal in number to the total number of motors 23 and 24, and the shaft sections are connected by electrically operated couplings designated as 91AB, 91BD, 91DE, 91EF, 91FH and 91HJ located between the ends of the unit sections. The sections 89B and 89F of the pilot shaft are driven by the pilot motors 92B and 92F respectively through electrically operated couplings 93B and 93F and pairs of bevel gears 94B and 94F. The pilot shaft sections 89A, 89D, 89E and 89H raise or lower the crossheads 67 of the several dependent controllers 54, by being coupled thereto by paired bevel gears 96 and threaded shafts 97. The pilot shaft sections 89B and 89F raise or lower the crossheads 66 of the master controllers 56, through paired bevel gears 96 and threaded shafts 97. Thus either pilot motor 92B or 92F operating alone or both pilot motors operating together can actuate all the crossheads and thus control the speed of the master motors for slow speed operation, and all of the master and dependent motors in unison for high speed operation.

Figure 6:
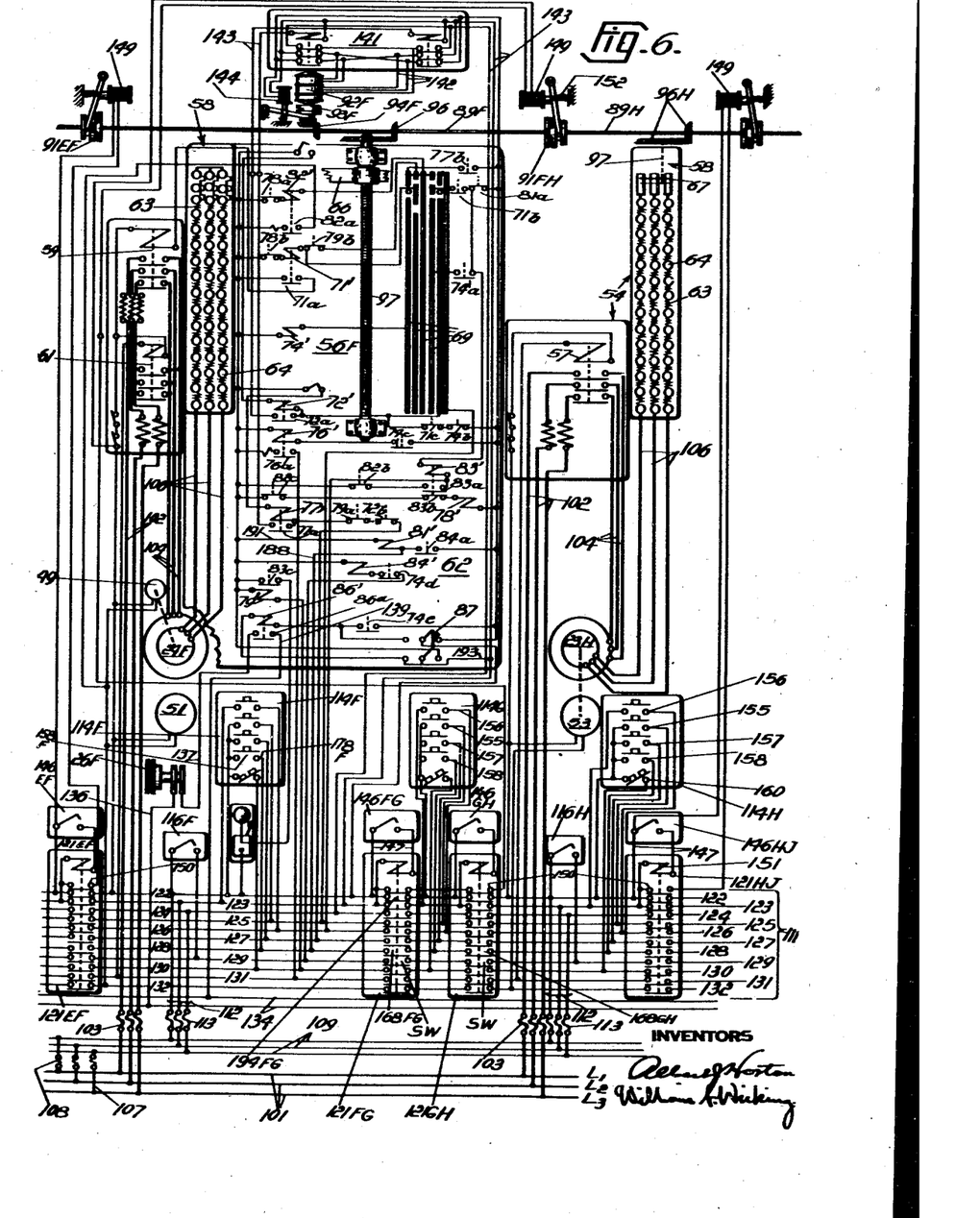
Figure 6 is a schematic wiring diagram of the master panel shown in Figure 5, and also of a dependent panel both connected to their respective motors and control stations.

As shown in Figures 1 and 6 a main electric circuit 101, composed of three main power conductors, L1, L2 and L3, is carried to the controllers and at each controller a branch circuit 102 having three power conductors, extends through fuses 103 to the motor contactors 57 of the dependent controllers 54A, 54D, 54E, and 54H, and the motor contactors 59—61 of the master controllers 56B and 56F. From the motor contactors of each controller, three wires extend by way of a circuit 104 to a stator portion of each of the wound-rotor induction motors 23 and 24. From the rotors of each of the motors, three conductors are connected by a circuit 106 to each of the speed control rheostats 58 of the several master and dependent controllers. At one point a tap 107 from the three conductors of the main power circuit 101 extends through fuses 108 to energize a control circuit feeder 109 that extends the full length of the printing machine.

A main control cable 111 (Figure 1), composed of sections 111A, 111B, 111D, 111E, 111F and 111H, one for each printing unit, and sections 111C and 111G, one for each folder, is preferably placed over the side frames of the units and extends the complete length of the printing machine. A plurality of circuits 112, equal in number to the number of printing units and each consisting of three conductors extends from the control feeder 109 through fuses 113 to supply three-phase control power to three conductors 122, 123 and 124 of the control cable sections 111A, 111B, 111D, 111E, 111F and 111H.

Each of the sections 111A, 111B, 111D, 111E, 111F, and 111H, associated with a printing unit, has a push-button control station 114A, 114B, 114D, 114E, 114F and 114H, a paper break switch 116A, 116B, 116D, 116E, 116F, and 116H, a contactor coil circuit 117, and a motor brake circuit 118 connected thereto. In addition to the above, the sections 111B and 111F each have a master controller circuit 119 extending to the master control assemblies 62B and 62F respectively. It will be noticed that the sections 111C and 111G associated with the folders each have a push-button control station 114. Only one push-button station and one paper break switch has been shown, as being associated with each printing unit and folder but more may be provided if desired.

One of a plurality of electrically operated multiswitch relays or sectionalizers 121AB, 121BC, 121CD, 121DE, 121EF, 121FG, 121GH, and 121HJ, is located between each two adjacent printing units and at each side of each folder where there is a printing unit. Each sectionalizer is arranged to connect or disconnect a pair of adjacent control-cable sections with or from each other. As best seen in Figure 6, each section of the control-cable 111 is composed of a plurality of conductors 122, 123, 124, 125, 126, 127, 128, 129, 130, 131 and 132, and each sectionalizer 121 has a plurality of solenoid operated normally-open switches equal in number to one more than the number of control conductors in the control cable 111. The extra switch in each of the sectionalizers controls a solenoid for operating a pilot line shaft coupling to be hereinafter described. The sectionalizer switches, when open, separate each control conductor into a plurality of sections. It will be noted that the conductors 122, 123, and 124 are line wires fed from the feeder 109 through the fuses 113.

A circuit 134 consisting of a pair of conductors supplies direct current power to the magnetic clutches 26B and 26F, associated with each of the master motors 24B and 24F respectively. The circuit which supplies the clutch 26F may be traced as follows: from one of the direct current conductors (Figure 6) of the circuit 134 through a conductor 136, to the clutch coil 26F, thence through a conductor 137, to a switch 86a of the magnetic clutch relay 86 and through a conductor 138 to the other conductor of the direct-current circuit 134.

The pilot motors 92B and 92F (Figure 1) are controlled by reversing switches 141B and 141F, which in turn are controlled by the master control assemblies 62B and 62F, respectively. Circuits 142 connect the pilot motors 92 to the reversing switches 141, and circuits 143 connect the switches 141 to the master control assemblies 62. The solenoids 144B and 144F for operating the couplings 93B and 93F are under the control of the same circuit 143 from the master control panel, that feeds the motors 92B and 92F, through the reversing switches 141B and 141F respectively.

From Figure 1, it will be noted that each main line shaft coupling 22 operably engages a normally-open limit switch 146 which opens when the coupling is opened to deenergize a circuit 147 connected to a coil 151 (Figure 6) of an associated sectionalizer 121. Also the sectionalizers 121AB, 121CD, 121DE, 121EF, 121GH, and 121HJ, each by means of a circuit 148, control the operation of solenoids 149AB, 149BD, 149DE, 149EF, 149FH, and 149HJ, which in turn control the pilot shaft couplings 91AB, 91BD, 91DE, 91EF, 91FH, and 91HJ respectively. Whenever one of the main line couplings 22 is opened a coil 151 of the associated sectionalizer 121 will be deenergized by the opening of the associated coupling switch 146, and a switch 150 in the associated sectionalizer 121 will open the associated pilot shaft coupling 91 by deenergizing its operating solenoid 149. There is no pilot shaft coupling associated with the sectionalzers 121BC and 121FG. However, if either of the sectionalizers 121BC or 121CD is opened, the solenoid 149BD will be deenergized and the couplings 91BD will be opened by a spring 152. In like manner, if either of the sectionalizers 121FG or 121GH is opened, the solenoid 149FH will be deenergized with the result that the coupling 91FH will be opened by its spring 152. This arrangement makes it possible to group the folders 14C and 14G with printing units on either the left or the right thereof. For example, by opening the main line shaft coupling 22GH, the sectionalizer 121GH opens and the pilot shaft coupling 91FH opens. Then the folder 14G can be run in operative co-operation with the printing units 11D, 11E and 11F. Also, by opening the main line shaft coupling 22FG, the sectionalizer 121FG will open and the pilot shaft coupling 91FH will open. Then the folder 14G can be run in operative cooperation with the printing units 11H and any other printing units to the right thereof.

To those versed in the art, it will be apparent that portions of the arrangement shown in Figure 6 are more or less conventional, in that a plurality of push-button stations 114F, 114G, and 114H each include a "signal" button 156, a "slow-inch" button 155, an "on" button 157, a "stop" button 158, and a "safe" button 160, which in turn control master panel relays designated as "signal relay" 83, "slowspeed" relay 71, "on" relay 77, "stop" relay 81, and "safe" relay 79. Also, the paper break switch 116 controls the paper break relay 84. The slow speed relay 71 and the high speed relay 74 are controlled by the contact strips 68 and the crosshead 62 of the master control assembly 62, and the drive motor relay 76, and the magnetic clutch relay 86 are controlled by the fast speed relay 74.

The arrangement of circuits departs from usual practice in that in place of all of the control circuits being connected through manually operated transfer switches, the various push-button stations, relays, paper break switches, the solenoids of the fast-speed relay 74 and the brakes 49, 51, and 53 are connected to sections of the various conductors in the main control cable 111. Due to the plurality of switches of the sectionalizer being arranged to sectionalize the various conductors of the control cable, this arangement of circuits makes it possible to divide the whole printing machine control into separate controllers, each including a master control assembly 62, and the necessary push-button stations, contactors, relays, and paper break switches for a group of printing units and a folder. For example, if the coupling 22GH is opened, the sectionalizer 121GH and pilot shaft coupling 91FH will be opened (Figures 1 and 6), in a manner previously described. Opening the sectionalizer 121GH separates the portion of each of the eleven control conductors that lies to the left of the sectionalizer from the portions of the conductors which lie to the right thereof. The push-button station 114G for the folder 14G, which is to the left of the open sectionalizer, will operate with the push-button stations 114F and 114E to control the master controller 56F. The push-button station 114H located to the right of a sectionalizer 121GH will have no effect on the master controller 56F, but will control a master controller, which although not shown, will be understood to be located to the right of the sectionalizers 121GH and 121HJ.

As a specific example of one of the eleven conductors that are sectionalized by the opening of the sectionalizer 121GH, it will be noted (Figure 6) that the "stop" push-button 158 in the push-button station 114H to the right of the open sectionalizer switch is disconnected from the coil of the stop relay 81 of a master controller 56F due to a switch 168GH of the sectionalizer 121GH being opened. On the other hand, the "stop" push-button 158 in the push-button stations 114G and 114F are both capable of energizing the solenoid of the "stop" relay 81 on the master controller 56F. The circuits which accomplish this may be traced as follows: From line 122 through "stop" push-button 158F in the push-button station 114F, through a conductor 178F, to control bus conductor 128, thence through a conductor 188 to the coil of the stop relay 81, through a conductor 191, through one pole of the transfer switch 87 to a conductor 193, thence through a conductor to the line 123. Since the sectionalizers 121 EF and 121FG are closed, the push-buttons 158 in the push-button stations 114E or 114G will be in parallel with the push-button 158F in the station 114F, and thus be capable of energizing the solenoid of the stop relay 81 in the master controller 56F. Specifically, the stop button 158 of station 114G is in parallel with the stop button 158F of station 114F by the following circuits: (1) A circuit from the "stop" button 158F of station 114F extends through the conductor 178F, through the control cable conductor 128, a contact 168FG, and to the push-button 158 of station 114G and (2) A circuit from stop button 158F of station 114F through the conductor 122, a switch 194FG, control-cable conductor 122, to the second push-button 158 of station 114G.

Similarly, circuits can be traced for each of the control-cable conductors 122, 123, 124, 125, 126, 127, 128, 129, 130, 131, and 132, but it is believed that the previously described circuits are sufficient to explain the means herein disclosed for sectionalizing the control of a multi-unit machine driven by a plurality of motors as herein shown, so that any desired grouping of units may be operated together.

In order to arrange the printing machine herein shown for printing products requiring three printing units, the printing units 11A, 11B, and 11D (Figure 1) are grouped with the folder 14C, and the units 11E, 11F, and 11H are grouped with the folder 14G by opening the coupling 22DE in the line shaft 17 between the units 11D and 11E. This arrangement provides two complete printing machines each having three printing units and a folder. Obviously a grouping including a greater or a lesser number of printing units with a folder may be arranged as desired, and in a machine having a greater number of units and folders in the line, more groups can be made. Opening the coupling 22DE in the main line shaft 17, segregates the shaft sections 17A, 17B, 17C, and 17D from the sections 17E, 17F, 17G, and 17H. Opening the coupling 22DE also opens the normally-open switch 146DE, and deenergizes the coil of the normally-open sectionalizer 121DE. Opening the sectionalizer 121DE deenergizes the pilot-shaft coupling solenoid 14DE and allows the spring 152 to open the coupling 1DE and separate the pilot line shaft into two parts one of which includes sections 89A, 89B, 89D, and the other, sections 89E, 89F, and 89H. Opening the sectionalizer 121DE also disconnects all of the control conductors to the left of it from the control conductors to the right, so that push-buttons 114A, 114B, 114C and 114D, the paper break switches 116A, 116B, and 116D, the master controller 56B, and the dependent controllers 54A and 54D operate together to control motors 23A, 24B and 23D, to drive the printing units 11A, 11B, 11D and the folder 14C, while the push-buttons 114E, 114F, 114G and 114 H, the paper break switch 116E, 116F, 116H, the master controller 56F, and the dependent controllers 54E and 54H, operate together and independently of the first mentioned equipment to control motor 23E, 24F and 23H to drive the printing units 11E, 11F, 11H and the folder 14G. Thus the whole printing machine is automatically broken up into two separate printing machines by simply opening one coupling 22DE in the main line shaft 17. Opening any one of the couplings 22AB, 22BC, 22DE, 22EF, 22FG, 22GH or 22HJ will in like manner divide the printing machine into two separate printing machines composed of units located on the left and to the right of the open coupling.

If it is desired to operate printing units 11B, 11D, 11E and 11F as a group with holder 14C, and clutches 22AB and 22FG are opened, it will be seen that two master motors are connected to the group. Both of the master controllers 56B and 56F will then function simultaneously and both master motors 24B and 24F will operate together for both slow speed and high speed operation of the machine. However means are provided to make either of these motors a dependent motor, and use only one master controller to control the group.

In order to operate the master motor 24B as a dependent motor and control it by the master controller 56F, the transfer switch on master panel 56B corresponding with the switch 87 on the master panel 56F (Figure 6) is closed toward the left. This energizes the magnetic clutch 26B and connects the machine driving shaft to the motor 24B in the same gear relationhip as it is connected to the dependent motors. This movement of the transfer switch also opens the control circuit of the slow speed contactor 59 of master controller 56B, but the high speed contactor 61 will be energized by the action of the master controller 56F, and the motor 24B will then function as a dependent motor. It will be understood that the master panels 56B and 56F being identical, if the transfer switch of master panel 56F is closed toward the left, and the transfer switch of panel 56B is closed toward the right, then panel 56B will be a master panel and panel 56F will be made a dependent panel, to operate the motor 24F as a dependent motor.

It will be understood that, although not shown, each printing unit may be provided with the usual web severing devices, emergency push-buttons having independent circuits connected to the controller through an emergency transfer switch, magnetically operated cylinder brakes arranged to supply braking torque to the cylinders when emergency stops are made, flashing relays which operate to flash the press unit lights before the press can be started and other usual features.

Figure 7:
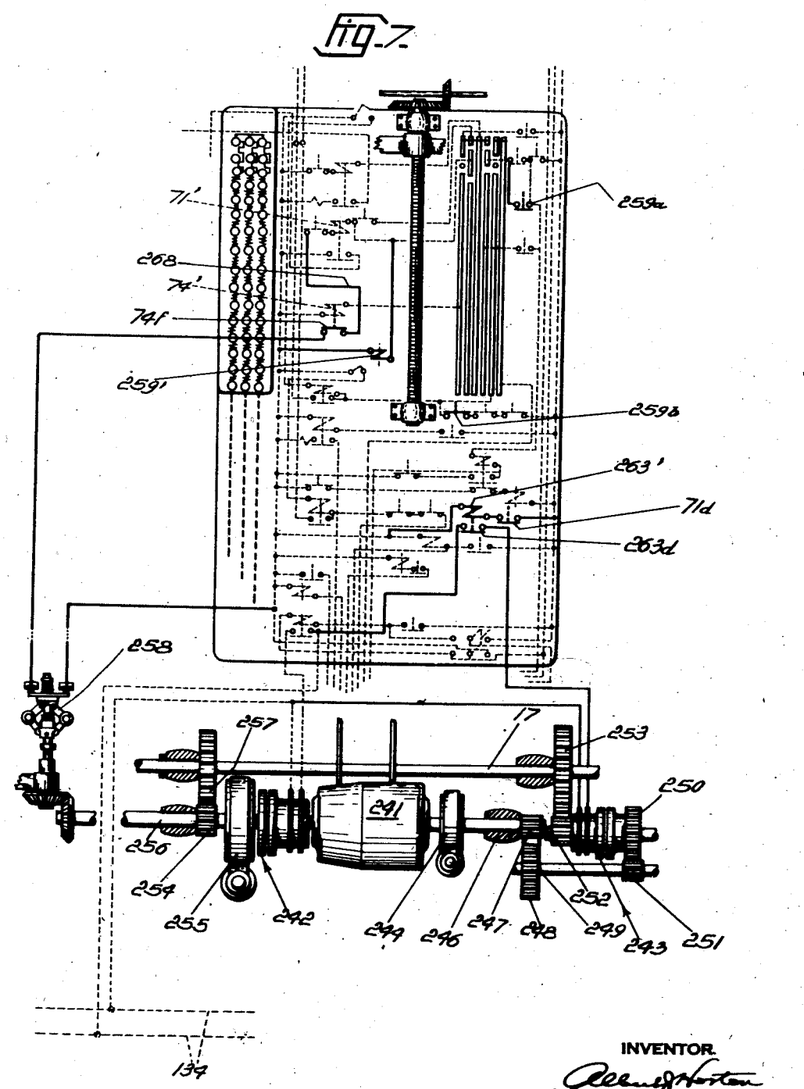
Figure 7 is a schematic wiring diagram showing a modified form of the invention.

In the modified form of the invention shown in Figure 7, a controller suitable for use with driving connections such as are illustrated in Figure 6 of the hereinbefore mentioned application Serial Number 369,793 is disclosed. The motor 241 corresponds to the master motors 24B and 24F of the arrangement previously described herein. It is connected to the line shaft 17 through either of two magnetic clutches 242 or 243. When the motor 241 is started for the slow speed or web threading operation, the clutch 243 is closed and a pinion 247 carried on a shaft 246 of the motor 241 drives a gear 248 secured to a jack shaft 249 that carries a pinion 251. The pinion 251 is in mesh with and drives a gear 250 secured to one part of the clutch 243. The other part of the clutch 243 is secured to a gear 252 which is in mesh with and drives a gear 253 secured to the main line shaft 17. When it is desired to run the printing machine at high or printing speed, the clutch 243 is deenergized and the clutch 242 is energized to connect the line shaft 17 with the motor 241 through the spur gear 254 carried by a shaft 256 and through the gear 257 secured to the main line shaft 17. The shafts 246 and 256 are each provided with electrically operated brakes 244 and 255 respectively.

The two brakes 244 and 255 may be connected in parallel and correspond respectively to the brakes 49 and 51 of the arrangement shown in Figure 3.

The electrical devices for the arrangement shown in Figure 7 are similar to those shown in Figures 1 to 6 except that Figure 7 includes a normally-closed centrifugal switch 258, a control relay 259 with one normally-open and one normally-closed switch 259a and 259b respectively, a slow speed clutch relay 263 with normally-open switch 263a, an extra normally-closed switch 74f attached to the fast speed relay 74, an additional normally-open switch 71d attached to the slow speed relay 71. Variations in the connections from the form shown in Figure 6, are indicated by the conductors shown in heavy lines, and substitute a conductor to carry the circuit of the slow speed relay 71 through the centrifugal switch 258. The centrifugal switch 258 acts during deceleration of the machine from printing speed, to prevent current being supplied to the slow speed gear clutch 243, until the machine is decelerated to a relatively slow speed, at which time the master motor is again energized.

It will be understood that the invention may be embodied in other specific forms without departing from the spirit or essential attributes thereof, and it is therefore desired that the present embodiments be considered in all respects as illustrative and not restrictive, and it will be further understood that each and every novel feature and combination present in or possessed by, the mechanism herein disclosed forms a part of the invention included in this application.

What we claim is:

1. A control system for a printing machine comprising a plurality of printing units and folders connected to a drive shaft, a first driving motor associated with one of the units and having gearing and connections to the drive shaft for driving the machine at slow speed and at running speeds, second driving motors for the remaining units having connections to the shaft for driving the machine at running speeds only; including a speed controller for each of the driving motors, a control cable section for each printing unit and for each folder, a sectionalizing switch for connecting the control cable section of each unit and each folder with the control cable section of an adjacent unit or folder, a control shaft for each speed controller, a pilot motor connected to one of the control shafts, couplings to connect the several control shafts together, a master panel associated with the speed controller for the first driving motor to control the pilot motor and thereby operate all of the speed controllers, first actuating the first driving motor to operate the machine at slow speed, and subsequently actuating all of the motors to accelerate the machine and drive it at high speed, the pilot motor being reversely operable to decelerate the machine to an intermediate speed, and then again actuate the first driving motor to operate the machine at slow speed.

2. In a control system for a multi-unit machine having a plurality of printing units arranged in line, a driving shaft connected to all of the units, a pair of master motors connected to the driving shaft and arranged to drive the machine at all speeds, a plurality of dependent motors connected to the driving shaft and arranged to drive the machine at normal running speeds only, a master controller for each of the master motors, a dependent controller for each of the dependent motors, and a switch for converting one of the master controllers into a dependent controller, and thereby operating one of the master motors as a dependent motor.

3. In a control system for a multi-unit machine having a plurality of printing units and interposed folders arranged in line and each having a control station, a sectional main driving shaft having a shaft section associated with each printing unit and with each folder, a plurality of motors one connected to drive each of the driving shaft sections associated with the printing units, a controller associated with each motor, a sectional control cable having a section connected with each control station, a sectional pilot shaft having a shaft section associated with each controller, a plurality of couplings for joining adjacent main driving shaft sections, a plurality of sectionalizing switches for joining adjacent sections of the control cable, first and second couplings for joining adjacent pilot shaft sections, the first couplings being located between pilot shaft sections associated with controllers for adjacent printing units and the second couplings being located between pilot shaft sections associated with printing units that are separated by an interposed folder, means for operating each of the sectionalizing switches when the corresponding coupling in the driving shaft is operated, means for operating a first pilot shaft coupling when the corresponding sectionalizing switch is operated, and means for operating a second pilot shaft coupling from either of two of the sectionalizing switches.

4. A printing machine having a plurality of printing units arranged in a line with an occasional folder interposed between printing units, a sectional main driving shaft having a section associated with each printing unit and with each folder and having couplings between adjacent sections, a sectional control cable having a section associated with each printing unit and with each folder and having sectionalizing switches for connecting and disconnecting adjacent cable sections, a sectional pilot shaft having a section associated with each printing unit, means actuated by operation of a main driving shaft coupling located between printing unit sections of the main driving shaft to operate a printing unit sectionalizing switch and pilot coupling located between corresponding cable and pilot shaft sections, means actuated by operation of a coupling located at either side of a folder driving shaft section to operate a corresponding folder sectionalizing switch, and means operated by either of the folder sectionalizing switches so operated to open the pilot shaft coupling located between the pilot shaft sections for the printing units between which the folder is interposed.

5. In a control system for a multi-unit printing machine having a plurality of printing units arranged in a line with an occasional folder interposed between printing units, a driving shaft having a section associated with each printing unit and with each folder and having couplings between adjacent sections, a plurality of master motors connected to some of the drive shaft sections and arranged to drive them at all operating speeds, a plurality of dependent motors connected to other of the driving shaft sections and arranged to drive them at normal running speeds only, a master controller for each of the master motors, a dependent controller for each of the dependent motors, switch means for converting any master controller into a dependent controller and thereby operating a master motor as a dependent motor, and means for operating the couplings whereby a printing machine may be controlled by a selected number of master and dependent controllers.

6. In a control system for a multi-unit printing machine having a plurality of printing units arranged in a line with an occasional folder interposed between printing units, a driving shaft connected to all of the units, a control cable having a section associated with each printing unit and a section associated with each folder and having sectionalizing switches for joining and separating adjacent cable sections, a pair of master motors connected to the driving shaft and arranged to drive the machine at all operating speeds, a plurality of dependent motors connected to the driving shaft and arranged to drive the machine at normal running speeds only, a master controller for each of the master motors, a dependent controller for each of the dependent motors, connections between each of the controllers and sections of the control cable, and a switch for converting one of the master controllers into a dependent controller, and thereby operating one of the master motors as a dependent motor.

7. In a control system for a multi-unit printing machine having a plurality of printing units and folders arranged in line, a main drive shaft section for each printing unit and for each folder, each such shaft section having a coupling member at each end for engagement with a co-operating coupling member to join adjacent shaft sections together, a plurality of motors each connected to a drive shaft section, a controller for each motor, a control station for each printing unit and for each folder; the combination therewith of a group of control conductors co-extensive with the line of printing units and folders and connected to the controllers and the control stations, sectionalizing switches corresponding to the pairs of coupling members, for dividing the group of control conductors into sections each connected to a controller and a control station, and limit switches each operably connected to a drive shaft section coupling member for actuating a corresponding sectionalizing switch when a pair of coupling members are disengaged, thereby automatically providing for the independent control of selected groups of printing units and folders solely by operation of drive shaft section coupling members.

8. In a control system for a printing machine having a plurality of printing units and folders arranged in line with a motor connected to each unit, a common driving shaft section for each unit and each folder with couplings for connecting the sections together for simultaneous operation of all units and folders, and for disconnecting certain couplings for independent operation of selected groups of desired units and folders, a motor control station at each unit and folder, a group of control conductors co-extensive with the line of printing units and folders, and connected to each control station, and sectionalizing switches in the control conductors corresponding to the said couplings and each connected between two of the control stations; the combination therewith of a plurality of limit switches each operable by movement of one of the said couplings to actuate the corresponding sectionalizing switch when the coupling member is operated, thereby providing for the independent control of selected groups of printing units and folders solely by operation of the said coupling members.

9. In a control system for a printing machine having printing units arranged in alignment and operably connected by a sectional drive shaft with couplings between the units and with a motor connected to each drive shaft section; the combination therewith of a control cable supported along the frames of the said units and extending throughout the length of the machine, sectionalizers in the control cable between the units, and limit switches each operated by the release of a coupling, for actuating the sectionalizers to interrupt the circuits of the control cable between the units adjacent the released coupling, and without other action permit independent operation of the units thus disconnected.

10. In a control system for a printing machine having printing units arranged in alignment and operably connected by a sectional drive shaft with couplings between the units and with a motor connected to each drive shaft section; the combination therewith of a duct supported along the frames of the said units and extending throughout the length of the machine, sectionalizing switches associated with the duct, control conductors in the duct, a control station for each unit and connected with the conductors, limit switches between each of the units, each limit switch operated by disconnecting a coupling and connected to a sectionalizing switch, whereby disconnecting any coupling will mechanically disconnect a printing unit on one side of the coupling from a printing unit on the other side and electrically disconnect the control circuits of the said printing units on each side of the coupling.

ALBERT J. HORTON.
WILLIAM C. WIEKING.

REFERENCES CITED

The following references are of record in the file of this patent:

UNITED STATES PATENTS

| Number | Name | Date |
|---|---|---|
| 1,616,760 | Rodman et al. | Feb. 8, 1927 |
| 1,176,542 | Goldenstein | Mar. 21, 1916 |
| 1,734,077 | Cline | Nov. 5, 1929 |
| 2,356,160 | Horton | Aug. 22, 1944 |
| 2,183,720 | Longee et al. | Dec. 19, 1939 |

FOREIGN PATENTS

| Number | Country | Date |
|---|---|---|
| 352,649 | Great Britain | July 16, 1931 |
| 426,719 | Great Britain | Apr. 4, 1935 |